(12) United States Patent
Chen et al.

(10) Patent No.: US 12,148,248 B2
(45) Date of Patent: Nov. 19, 2024

(54) ENSEMBLE DEEP LEARNING METHOD FOR IDENTIFYING UNSAFE BEHAVIORS OF OPERATORS IN MARITIME WORKING ENVIRONMENT

(71) Applicants: Shanghai Maritime University, Shanghai (CN); Shanghai Ship and Shipping Research Institute, Shanghai (CN)

(72) Inventors: Xinqiang Chen, Shanghai (CN); Zichuang Wang, Shanghai (CN); Yongsheng Yang, Shanghai (CN); Bing Han, Shanghai (CN); Zhongdai Wu, Shanghai (CN); Chenxin Wei, Shanghai (CN); Huafeng Wu, Shanghai (CN); Yang Sun, Shanghai (CN)

(*) Notice: Subject to any disclaimer, the term of this patent is extended or adjusted under 35 U.S.C. 154(b) by 363 days.

(21) Appl. No.: 17/747,946

(22) Filed: May 18, 2022

(65) Prior Publication Data
US 2023/0222841 A1 Jul. 13, 2023

(51) Int. Cl.
*G06V 40/20* (2022.01)
*G06V 10/62* (2022.01)
(Continued)

(52) U.S. Cl.
CPC .............. *G06V 40/20* (2022.01); *G06V 10/62* (2022.01); *G06V 10/7715* (2022.01);
(Continued)

(58) Field of Classification Search
CPC .. G06V 10/454; G06V 10/62; G06V 10/7715; G06V 10/806; G06V 10/82;
(Continued)

(56) References Cited

U.S. PATENT DOCUMENTS

| 8,954,306 B2 | 2/2015 | Li et al. |
| 10,803,172 B2 | 10/2020 | Diehl et al. |
| 11,176,684 B2 | 11/2021 | Yang et al. |

FOREIGN PATENT DOCUMENTS

CN 112784722 A * 5/2021 ......... G06K 9/00369

OTHER PUBLICATIONS

C. -C. Liu and J. J. - C. Ying, "DeepSafety: A Deep Learning Framework for Unsafe Behaviors Detection of Steel Activity in Construction Projects," 2020 International Computer Symposium (ICS), Tainan, Taiwan, 2020, pp. 135-140, doi: 10.1109/ICS51289. 2020.00036. (Year: 2020).*

* cited by examiner

*Primary Examiner* — Michael J Vanchy, Jr.
(74) *Attorney, Agent, or Firm* — Rahman LLC

(57) ABSTRACT

The present invention proposes an ensemble deep learning method for identifying unsafe behaviors of operators in maritime working environment. Firstly, extract features of maritime images with the You Only Look Once (YOLO) V3 model, and then enhance a multi-scale detection capability by introducing a feature pyramid structure. Secondly, obtain instance-level features and time memory features of the operators and devices in the maritime working environment with the Joint Learning of Detection and Embedding (JDE) paradigm. Thirdly, transfer spatial-temporal interaction information into a feature memory pool, and update the time memory features with the asynchronous memory updating algorithm. Finally, identify the interaction between the operators, the devices, and unsafe behaviors with an asynchronous interaction aggregation network. The proposed invention can accurately determine the unsafe behaviors of the operators, and thus provide operation decisions for maritime management relevant activities.

5 Claims, 3 Drawing Sheets

(51) Int. Cl.
*G06V 10/77* (2022.01)
*G06V 10/80* (2022.01)
*G06V 10/82* (2022.01)
*G06V 20/40* (2022.01)
*G06V 20/52* (2022.01)

(52) U.S. Cl.
CPC ............ *G06V 10/806* (2022.01); *G06V 10/82* (2022.01); *G06V 20/46* (2022.01); *G06V 20/49* (2022.01); *G06V 20/52* (2022.01)

(58) Field of Classification Search
CPC ........ G06V 20/44; G06V 20/46; G06V 20/49; G06V 20/52; G06V 20/54; G06V 40/20
See application file for complete search history.

ENSEMBLE DEEP LEARNING METHOD FOR IDENTIFYING UNSAFE BEHAVIORS OF OPERATORS IN MARITIME WORKING ENVIRONMENT

CROSS-REFERENCE TO RELATED APPLICATIONS

The subject application claims priority on Chinese patent application CN202210006996.1 filed on Jan. 8, 2022, the contents and subject matter thereof being incorporated herein by reference.

FIELD OF INVENTION

The invention relates to a technical field of maritime surveillance field, in particular to identify unsafe behavior from maritime working conditions via an ensemble deep learning framework.

BACKGROUND ART

Video-based unsafe behavior recognition methods consist of hand-crafted feature supported methods and deep learning related models. The hand-crafted feature supported methods extract manual features from the input images, and then the extracted feature vectors are fed into the classifier to obtain the human behavior recognition results. For example, the contour-based method firstly extracts features from the input images, and then obtains the imaging region of human behavior via background subtraction method, and finally extracts the behavior-related contour information. The contour-based methods are powerful in representing behavior semantic features with weakness of sensitive to perspective angle, mutual occlusion, camera imaging noise, etc. The human body joint point-based methods achieve the task of behavior feature representation by estimating the positions of human joint points and their kinematic information. The human body joint point-based methods can obtain satisfied performance with large computational cost. The spatial-temporal interest points supported methods achieve human behavior recognition task by detecting the spatial-temporal interest points from the input images, and do not require separating the foreground and background from the input images. The methods show powerful performance in the task of behavior recognition with complex background interference, while the interferences such as mutual occlusion and lighting conditions may degrade the method performance. The trajectory tracking based methods extract the behavior features by tracking the motion trajectory of human body, and the method can obtain human being movement status by eliminating the background interference.

The methods based on the deep learning models for human behavior recognition mainly include the two-stream convolutional neural networks, 3D convolutional neural networks, and recurrent neural networks. The two-stream network contains temporal stream convolutional neural network and spatial stream convolutional neural network. The two-stream network obtains higher behavior recognition accuracy on the premise of extracting the optical stream information from the input images. The 3D convolutional neural network employs the 3D convolutional kernel to extract spatial-temporal features from the input images, and the type of method can simultaneously extract features from several images. The recurrent neural network achieves the information accumulation by controlling the contribution of current and historical information in the input images with the disadvantage of gradient explosion.

SUMMARY OF THE INVENTION

The invention proposes an ensemble deep learning method for identifying unsafe behaviors of operators in maritime working environment. The proposed framework recognizes the kinematic interaction among operators, devices, and unsafe behaviors in maritime surveillance videos. The invention provides technical support for maritime traffic management and safety.

The technical solution of the present invention is as follows: an ensemble deep learning method for identifying unsafe behaviors of operators in maritime working environment, comprising the following steps:
  (1) extracting features of maritime images: inputting a surveillance video with one or a multitude of the operators operating a multitude of the devices in a maritime working environment, and decomposing the surveillance video into the maritime images, extracting the features from the maritime images based on the YOLO V3 detection model, and then constructing a feature pyramid structure within the YOLO V3 detection model;
  (2) retrieving spatial-temporal interaction information of the operators and the devices: extracting instance-level features of the operators and the devices in the maritime images with the JDE paradigm, and meanwhile storing time memory features of the operators in the maritime images; the spatial-temporal interaction information of the operators and the devices include the instance-level features and the time memory features; the unsafe behaviors are related with the operators (e.g., dockers, ship officers, etc.) operating the devices (e.g., ship bridges, mobile phones, helmets, etc.); for example, when the spatial-temporal interaction information of the operators and the devices recognize that the docker is operating the mobile phone or the ship officer is not operating the ship bridge, it is recognized as unsafe behavior.
  (3) updating a feature memory pool: transferring the spatial-temporal interaction information linked to unsafe behaviors of the operators into the feature memory pool, and then updating the time memory features of the operators in the maritime images with the asynchronous memory updating algorithm;
  (4) identifying the unsafe behaviors from the maritime images: establishing a spatial-temporal interaction relationship among the operators, the devices, and the unsafe behaviors via an asynchronous interaction aggregation network, and identifying the unsafe behaviors in the maritime images with the spatial-temporal interaction relationship.

Further, step (1) comprises the following steps:
  (1.1) extracting the features from the maritime images: inputting a surveillance video with one or a multitude of the operators operating a multitude of the devices in a maritime working environment, and decomposing the surveillance video into the maritime images, extracting the features in the maritime images using the DarkNet-53 backbone network of the YOLO V3 detection model, and then obtaining the features of each of frames in the maritime images;
  implementing a feature extraction from the maritime images with the DarkNet-53 backbone network consisting of convolutional layers and activation layers, with expressions of the convolutional layers and activation layers in Eq. (1) and Eq. (2):

$$F^{d+1}(i, j) = [F^d \odot \omega^{d+1}](i, j) + b \qquad (1)$$

$$Y_n = \begin{cases} x_n, & x_n \geq 0 \\ \dfrac{x_n}{a_n}, & x_n < 0 \end{cases} \qquad (2)$$

wherein F(i, j) denoting a pixel value of the features from each of the frames, ω denoting a convolutional kernel template, $F^{d+1}$ and $F^d$ respectively denoting the output of the convolutional layer of the layer d+1 and the layer d, b denoting a deviation value, ⊙ denoting a convolutional operation; $x_n$ and $Y_n$ denoting the input and the output of the activation layer of the layer n, $a_n$ denoting a constant value of the activation layer;

(1.2) augmenting image features: integrating the image features at different scales by introducing the feature pyramid structure, and then obtaining prediction head information related to a behavior recognition task in the maritime images;

implementing the feature pyramid structure by extracting bottom-up features and fusing top-down features; extracting the bottom-up features by a down-sampling operation and fusing the top-down features with an up-sampling operation and a lateral connection; the down-sampling operation is to merge the pixel value for augmenting the image features, the up-sampling operation is to copy the pixel value for augmenting the image features, and the lateral connection is to add the image features at the same scale together;

obtaining the prediction head information with a dense prediction map with a scale of (6P+Q)×W×H, wherein composing of classification information with a scale of 4P×W×H, and regression information with a scale of 2P×W×H, and embedding information with a scale of Q×W×H, wherein P is the number of anchor templates, Q is a embedding dimension, and W and H are the width and the height of the image features; the anchor templates are rectangular templates with different scale in the YOLO V3 detection model.

Further, step (2) comprises the following steps:

(2.1) predicting the prediction head information of the maritime images with the JDE paradigm: modeling a united learning function of the prediction head information as a multi-task learning problem with the JDE paradigm, and indicating the united learning function as a weighted linear loss sum of components, the components contain the classification information, the regression information, and the embedding information; predicting the prediction head information with the united learning function is shown in Eq. (3):

$$L_{unite} = \sum_{k=1}^{M} \sum_{j=\{a,b,c\}} w_j^k L_j^k \qquad (3)$$

wherein M denoting the number of the types of the prediction head information, $L_j^k$, k=1, . . . , M, j=a, b, c is a loss function corresponding to the different types of the prediction head information, $w_j^k$, k=1, . . . , M, j=a, b, c is a weight coefficient of the loss function;

(2.2) learning a loss weight automatically: determining the loss weight automatically based on the task-dependence uncertainty, and then obtaining the classification information, the regression information, and the embedding information, with expression of the function of learning the loss weight automatically is shown as Eq. (4):

$$L_{unite} = \sum_{k=1}^{M} \sum_{j=\{a,b,c\}} \frac{1}{2}\left(\frac{1}{e^{r_j^k}} L_j^k + r_j^k\right) \qquad (4)$$

wherein $r_j^k$, k=1, . . . , M, j=a, b, c representing the task-dependence uncertainty of each of the loss function;

(2.3) retrieving the spatial-temporal interaction information in the maritime images: splitting a maritime surveillance video into video clips, extracting the instance-level features of the operators and the devices in the maritime images with the united learning function, storing the time memory features of the operators.

Further, step (3) comprises the following steps:

(3.1) tracking the time memory features: transferring the instance-level features and the time memory features of the operators and the devices extracted by the JDE paradigm into the feature memory pool, recording the time memory features linked to the unsafe behaviors of the operators in the maritime images;

(3.2) updating the time memory features asynchronously: updating the time memory features linked to the unsafe behaviors in a training iteration with the asynchronous memory updating algorithm;

Updating the time memory features with following steps:

(3.2.1) reading the time memory features: reading the instance-level features and the time memory features of the operators and the devices from the feature memory pool for each of the video clips;

(3.2.2) writing the time memory features: terminating the training iteration of the asynchronous memory updating algorithm, writing the time memory features linked to the unsafe behaviors of the operators into the feature memory pool.

Further, step (4) comprises the following steps:

(4.1) establishing unsafe behavior interaction modules: inputting the instance-level features and the time memory features from the spatial-temporal interaction information extracted by the JDE paradigm, establishing three types of the unsafe behavior interaction modules consisting of an interaction between the operators, an interaction between the operators and the devices, a time-dependent interaction, wherein denoted as P module, O module, N module;

constructing the unsafe behavior interaction modules in the maritime images with transformer mechanism, the transformer mechanism assigning different attention weights to the sequence information for the unsafe behavior interaction modules, the P module describing the interaction among the operators in the maritime images, and the input of the P module is the instance-level features or the augmented instance-level features of the operators; the O module describing the interaction between the operators and the devices, and the input of the O module are the instance-level features of the devices; the N module identifying the unsafe behaviors with strong temporal correlation, and the input of the N module being the time memory features of the operators in the maritime images;

(4.2) building dense serial interaction aggregation structure: combining the three types of the unsafe behavior interaction modules in the maritime images, establishing the dense serial interaction aggregation structure based on a plurality of the P modules, the O modules, and the N modules;

the dense serial interaction aggregation structure stacking the different types of the unsafe behavior interaction modules sequentially, and then transmitting the spatial-temporal interaction information among the different types of the unsafe behavior interaction modules, learning the different types of the spatial-temporal interaction information in the different types of the unsafe behavior interaction modules;

(4.3) assigning weighted parameters: each of the unsafe behavior interaction modules receiving the output from the previous unsafe behavior interaction modules in the dense serial interaction aggregation structure, assigning the different weighted parameters to the output of the previous unsafe behavior interaction modules, integrating the spatial-temporal interaction information of the different types of the unsafe behavior interaction modules, with expression of the function of integrating the spatial-temporal interaction information and the SoftMax normalization function being shown as Eq. (5) and Eq. (6):

$$W_{i,m} = \sum_{m \in D} V_m * F_{i,m} \quad (5)$$

$$\sigma(t) = \frac{1}{1+e^{-t}} \quad (6)$$

wherein $W_{i,m}$ denoting a query feature from the m-th unsafe behavior interaction modules in the dense serial interaction aggregation structure, D denoting an index set of the previous unsafe behavior interaction modules, $V_m$ denoting a learnable multi-dimensional feature vector normalized by the SoftMax normalization function in the index set, * denoting an element-wise multiplication, and $F_{i,m}$ denoting the output of the features augmented by the m-th unsafe behavior interaction module; wherein t denoting a input of the SoftMax function $\sigma(t)$;

(4.4) establishing an unsafe behavior identification model in maritime images: inputting the instance-level features and the time memory features (the $P_i$, $O_i$, and $N_i$ spatial-temporal interaction features), modeling the spatial-temporal interaction relationship among the operators, the devices, and the unsafe behaviors based on the dense serial interaction aggregation structure, identifying unsafe behavior features $Y_i$ of the operators in the maritime working environment, with expression of the function of identifying the unsafe behavior features being shown as Eq. (7);

$$Y_i = Y(P_i, O_i, N_i, \delta) \quad (7)$$

wherein $P_i$ and $O_i$ denoting the instance-level features of the operators and the devices extracted by the JDE paradigm, $N_i$ denoting the time memory features, $\delta$ denoting parameters in the dense serial interaction aggregation structure, and $Y_i$ denoting the unsafe behavior features;

(4.5) obtaining unsafe behavior identification results: sending the unsafe behavior features into a classifier to identify the spatial-temporal interaction relationship among the operators, the devices, and the unsafe behaviors in the maritime images, and then obtaining the unsafe behavior identification results in the maritime images.

BRIEF DESCRIPTION OF THE DRAWINGS

For the purpose of clearly illustrate the technical solution of the invention, a brief description about the drawings is shown as follows.

EMBODIMENTS

Figure 1:
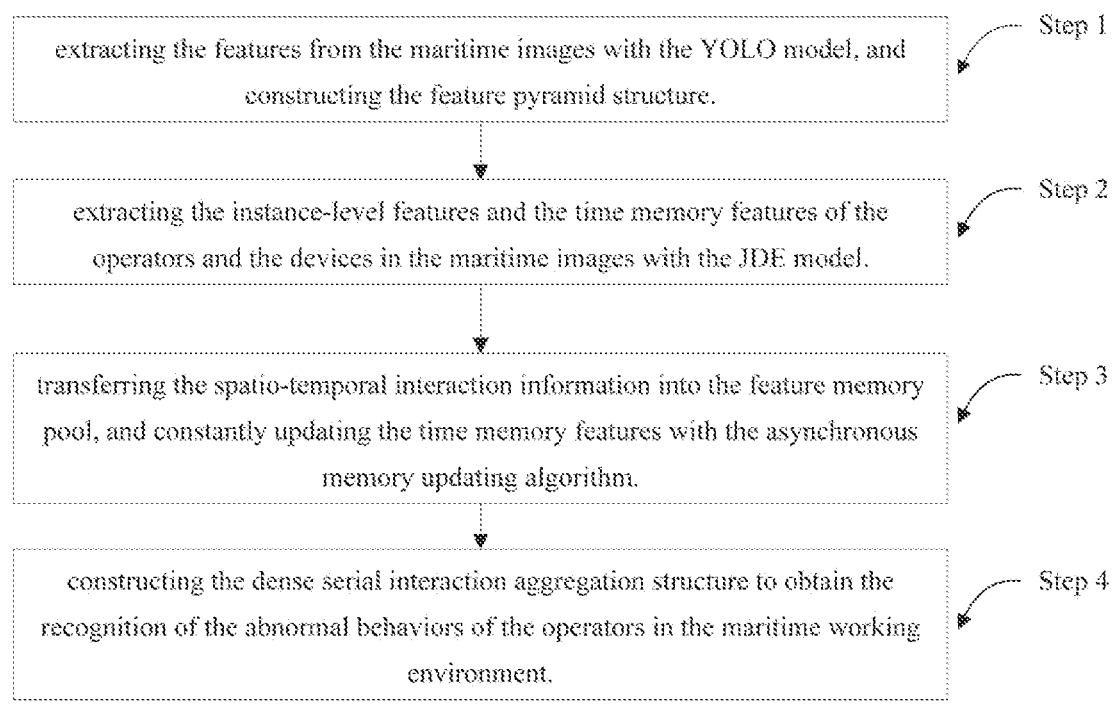
FIG. 1 is a flow chart of the proposed ensemble deep learning method for identifying unsafe behaviors of operators in maritime working environment.

To better understand the technical features, objectives and effects of the present invention, the invention is described in more detail as below with the support of accompanying figures. Note that the specific embodiments described herein are intended to explain the invention only, which does not intend to limit the patent of the invention. It should be noted that these figures are presented in a simplified yet easy-understandable manner to help better understand the proposed invention. The invention is described in more details as below, which consists of the following steps (see FIG. 1):

(1) inputting a surveillance video with one or a multitude of the operators operating a multitude of the devices in a maritime working environment, and decomposing the surveillance video into the maritime images, extracting the features from the maritime images based on the YOLO V3 detection model, and then introducing the feature pyramid structure to enhance the multi-scale detection capability of the YOLO V3 detection model, and finally obtaining the prediction head information which relates to the unsafe behavior recognition task via the support of the maritime images;

(2) extracting the instance-level features of the devices in the maritime images via the JDE paradigm, and storing the spatial-temporal interaction information of the operators in the maritime images; the spatial-temporal interaction information of the operators and the devices include the instance-level features and the time memory features; the unsafe behaviors are related with the operators (e.g., dockers, ship officers, etc.) operating the devices (e.g., ship bridges, mobile phones, helmets, etc.); for example, when the spatial-temporal interaction information of the operators and the devices recognize that the docker is operating the mobile phone or the ship officer is not operating the ship bridge, it is recognized as unsafe behavior.

(3) transferring the spatial-temporal interaction information of the unsafe behaviors in the maritime images, and then updating the time memory features of the operators in the maritime working environment with the asynchronous memory updating algorithm;

(4) connecting the spatial-temporal interaction relationship among the operators (e.g., dockers, ship officers, etc.), the devices (e.g., mobile phones, helmets, etc.), and the unsafe behaviors (e.g., phoning, not wearing helmet, etc.) by constructing the asynchronous interaction aggregation network.

A specific application of the present invention is described in detail as below:

First, collecting typical maritime video clips involving with unsafe behaviors, and then obtaining labels of the unsafe behaviors in a manual manner. The specific information of the video clips is shown in Table 1. Both of video #1 and video #2 are simulated in typical maritime working conditions, while the number of operators varies in the two video clips. Video #3 is the video clips related to the analysis of the unsafe behaviors of the on-duty ship officer in ship bridge area. The video clips include four typical unsafe behaviors: standing, walking, watching phones, answering phones.

TABLE 1

Information of video clips in port and shipping environment

| | frame rate | resolution | duration | maritime condition |
|---|---|---|---|---|
| video #1 | 25 frames per second | 926 × 522 | 10 s | port environment, one operator |
| video #2 | 25 frames per second | 814 × 458 | 10 s | port environment, multiple operators |
| video #3 | 25 frames per second | 704 × 576 | 10 s | ship bridge, multiple operators |

Figure 2:
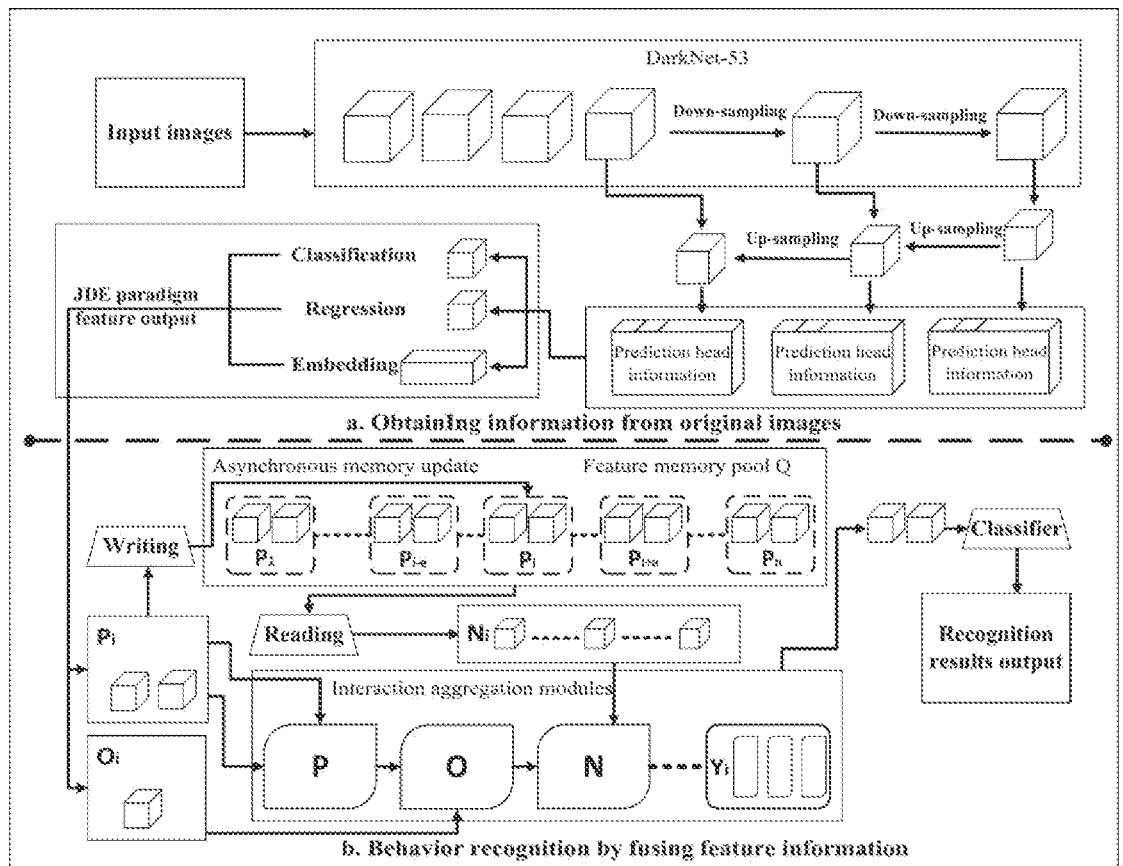
FIG. 2 is an overview of the proposed ensemble deep learning method for identifying unsafe behaviors of operators in maritime working environment.

The overview of the method for identifying unsafe behaviors of operators in maritime working environment is shown in FIG. 2. First, the method employs the DarkNet-53 backbone network of the YOLO V3 detection model to extract the features of the input maritime images. Then, the method performs the up-sampling operations, the down-sampling operations, and the lateral connections on the preliminary image features to introduce the feature pyramid structure in the YOLO V3 detection model. Finally, the method obtains the prediction head information of the operators and the devices in the maritime images, and the prediction head information consists of the classification information, the regression information, and the embedding information.

Second, obtaining each of the prediction head information is considered as a multi-task learning problem, and then the loss weights are learned by considering the task-dependence uncertainty. Finally, the spatial-temporal interaction information is obtained, while $P_i$ and $O_i$ are the instance-level features of the operators and the devices (e.g., mobile phones, helmets, etc.) in the maritime images obtained by the retrieval process of the JDE paradigm, $N_i$ is the time memory features of the operators. Then, the method transfers the time memory features of the operators in the maritime images obtained by the JDE paradigm into the feature memory pool Q, and then generate the dynamic long-term time memory feature via the asynchronous memory updating algorithm. The method continuously updates the time memory features linked to the unsafe behaviors in the features memory pool via the reading and writing operations in the training iteration.

Third, the method combines the spatial-temporal interaction information of the maritime images obtained by the JDE paradigm, and then establish different types of unsafe behavior interaction modules in the maritime images with the help of P module, O module and N module. More specifically, the P module describes the interaction between the operators in maritime working conditions, and the O module recognizes the interaction between the operators and the devices, and N module manages the unsafe behaviors with strong temporal correlation. Moreover, the method establishes the dense serial interaction aggregation structure via multiple types of the interaction modules, and the asynchronous interaction aggregation network is introduced to connect the spatial-temporal interaction relationship among the operators (e.g., dockers, ship officers, etc.), the devices (e.g., mobile phones, helmets, etc.), and the unsafe behaviors (e.g., phoning, not wearing helmet, etc.), and finally realizes the unsafe behavior identification in maritime working conditions.

Figure 3:
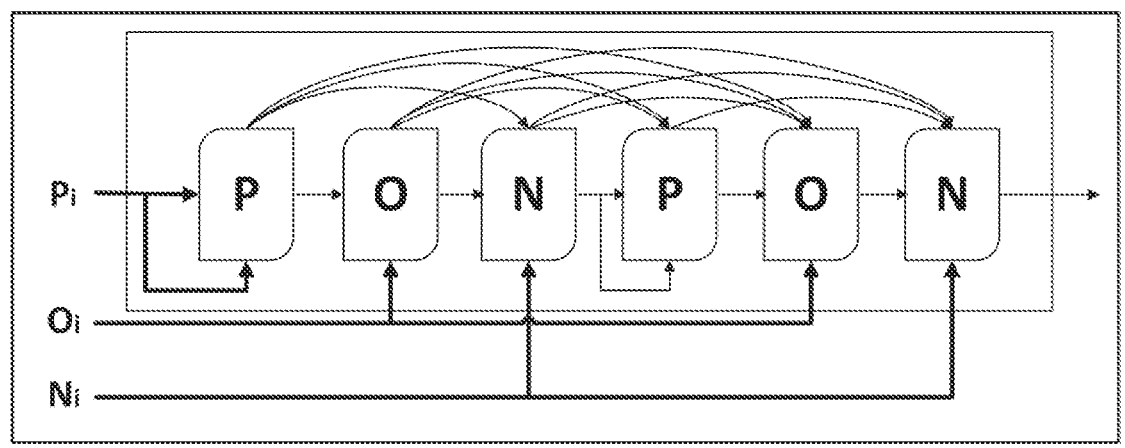
FIG. 3 is a structure diagram for describing a dense serial interaction aggregation structure constructed by the asynchronous interaction aggregation network of the proposed invention.

The constructed dense serial interaction aggregation structure is shown in FIG. 3. The dense serial interaction aggregation structure is designed to stack different types of the unsafe behavior interaction modules and transfer the extracted features across the unsafe behavior interaction modules. The module is designed to learn different types of the spatial-temporal interaction information.

Video #1 demonstrates the recognition results of unsafe behaviors of a single operator in the port environment, and the experimental results show that the unsafe behaviors of one operator in the port surveillance video can be accurately identified by the method, and the unsafe behaviors include standing, walking, watching phones, and answering phones. Video #2 demonstrates the recognition results of unsafe behaviors for several operators in the port environment, while the video #3 demonstrates the unsafe behaviors for ship crew on a ship bridge. It is noted that the image features for the on-duty operators in the maritime images are obviously different from those under normal behaviors. More specifically, the on-duty operators may be distracted when they are supposed to concentrate on their work.

The recognition results of unsafe behaviors in video #1 is shown in Table 2. Video #1 simulates the behaviors of one single operator in the port environment (marked as operator #1) including standing, walking, watching phones, and answering phones. The recognition accuracy of standing, walking, watching phones, and answering phones is 100%, 97%, 100%, and 76%, respectively. The recognition results of the unsafe behaviors in video #2 is shown in Table 3.

TABLE 2

Unsafe behavior recognition results of video #1

| | | identified result | | | |
|---|---|---|---|---|---|
| ground-truth result | | Standing | Walking | Watching phones | Answering phones |
| operator #1 | Standing | 100% | 0 | 0 | 0 |
| | Walking | 3% | 97% | 0 | 0 |
| | Watching phones | 0 | 0 | 100% | 0 |
| | Answering phones | 0 | 0 | 24% | 76% |

Video #2 simulates the unsafe behaviors of three operators (marking as operator #1, operator #2, operator #3), and the unsafe behaviors contains standing, walking, watching phones and answering phones. The ground-truth labels to the four types of the unsafe behaviors of operator #1 are respectively 0 frame, 250 frames, 209 frames, 0 frame, and the corresponding recognition results are 0 frame, 250 frames, 202 frames, and 7 frames (containing 7 frames of false recognition of watching phones behavior). Therefore, the accuracy of behavior recognition of standing and walking for the operator #1 is 100% and 97%. The ground-truth labels to the four types of the unsafe behaviors of operator #2 are 205 frames, 45 frames, 250 frames, and 0 frames, and the corresponding recognition results are 181 frames, 69 frames (containing 24 frames of false recognition of standing behavior), 250 frames, and 0 frames, so the recognition accuracy of standing, walking, and watching phones is 88%, 100%, and 100% respectively. The ground-truth labels to the four types of the unsafe behaviors of operator #3 are 90 frames, 160 frames, 220 frames, and 30 frames, the corresponding recognition results are 71 frames, 179 frames (containing 19 frames of false recognition of standing behavior), 223 frames (containing 3 frames of false recognition of answering phones behavior), 27 frames. Thus, the recognition accuracy of standing, walking, watching phones, and answering phones is 79%, 100%, 100%, and 90%, respectively.

TABLE 3

Unsafe behavior recognition results of Video #2
(/ represents no ground-truth label)

| ground-truth result | | Standing | Walking | Watching phones | Answering phones |
|---|---|---|---|---|---|
| | | | | identified result | |
| operator #1 | Standing | 100% | 0 | 0 | 0 |
| | Walking | 3% | 97% | 0 | 0 |
| | Watching phones | 0 | 0 | 100% | 0 |
| | Answering phones | 0 | 0 | 24% | 76% |
| operator #2 | Standing | 88% | 12% | 0 | 0 |
| | Walking | 0 | 100% | 0 | 0 |
| | Watching phones | 0 | 0 | 100% | 0 |
| | Answering phones | / | / | / | / |
| operator #3 | Standing | 79% | 21% | 0 | 0 |
| | Walking | 0 | 100% | 0 | 0 |
| | Watching phones | 0 | 0 | 100% | 0 |
| | Answering phones | 0 | 0 | 10% | 90% |

The recognition results of the unsafe behaviors in video #3 are shown in Table 4. The unsafe behaviors of the four operators (marking as operator #1, operator #2, operator #3, and operator #4) include standing, walking, talking, listening. The ground-truth labels to the four types of the unsafe behaviors of operator #1 are 250 frames, 0 frame, 250 frames, and 0 frame respectively; and the corresponding recognition results are 250 frames, 0 frames, 243 frames, and 7 frames respectively (containing 7 frames of false recognition of talking behavior). The recognition accuracy of standing and talking behaviors is 100% and 97%. The ground-truth labels to the four types of behaviors of operator #2 are 7 frames, 243 frames, 250 frames, 0 frame; the corresponding recognition results are 41 frames (containing 34 frames of false recognition of walking behavior), 209 frames, 250 frames, 0 frame. The recognition accuracy of standing, walking, and talking behaviors is 100%, 86%, and 100%, respectively. The ground-truth labels to the four types of the unsafe behaviors of operator #3 are 250 frames, 0 frame, 183 frames, and 67 frames; and the corresponding recognition results are 250 frames, 0 frame, 163 frames, and 87 frames (containing 20 frames of false recognition of talking behavior). The recognition accuracy of standing, talking, and listening is 100%, 89%, and 90% respectively. The ground-truth labels to the four types of the unsafe behaviors of operator #4 are 250 frames, 0 frame, 0 frame, and 250 frames, respectively; and the corresponding recognition results are respectively 250 frames, 0 frame, 0 frame, and 250 frames. The recognition accuracy of standing and listening behaviors is 100%, and 100%, respectively.

TABLE 4

Unsafe behavior recognition results of Video #3
(/ represents no ground-truth label)

| ground-truth result | | Standing | Walking | Talking | Listening |
|---|---|---|---|---|---|
| | | | identified result | | |
| operator #1 | Standing | 100% | 0 | 0 | 0 |
| | Walking | / | / | / | / |
| | Talking | 0 | 0 | 97% | 3% |
| | Listening | / | / | / | / |
| operator #2 | Standing | 100% | 0 | 0 | 0 |
| | Walking | 14% | 86% | 0 | 0 |
| | Talking | 0 | 0 | 100% | 0 |
| | Listening | / | / | / | / |
| operator #3 | Standing | 100% | 0 | 0 | 0 |
| | Walking | / | / | / | / |
| | Talking | 0 | 0 | 89% | 11% |
| | Listening | 0 | 0 | 0 | 100% |
| operator #4 | Standing | 100% | 0 | 0 | 0 |
| | Walking | / | / | / | / |
| | Talking | / | / | / | / |
| | Listening | 0 | 0 | 0 | 100% |

The average accuracy of the unsafe behavior identification in the above three experimental cases is more than 96%. Through the analysis of the experimental results, it is found that when the target operator does not change his actions frequently, the behavior recognition basically do not misjudge; the false detections occurs in the following two situations: (1) it occurs when one behavior changes to another, for example, it is easy to misjudge when the behavior transition between standing and walking states; (2) it also occurs when two behaviors are highly similar; for example, the operator's actions are very ambiguous when the behavior changes from watching phones to answering phones, so it is easy to make a false detection, and the time for a false detection is about one second.

Standardized operation of operators in the working environment is the basic guarantee for port production and ship safety navigation. Based on the port and shipping surveillance videos, the early warning of operator's unsafe behaviors provides important data for the decision-making of port production and water traffic safety. The proposed unsafe behavior recognition method is based on the deep learning model and video surveillance technology to extract the operator's unsafe behavior features, and then implements the asynchronous interaction aggregation network to identify and determine the unsafe behavior types. The proposed human unsafe behavior recognition method can achieve better accuracy in different maritime working environment. The experimental results under the port surveillance video data show that the present method can identify the unsafe behavior of operators with an accuracy of more than 90%. Based on the surveillance videos in the ship bridge, the proposed method can identify 97% of the operator's unsafe behaviors. The proposed framework in this invention can accurately identify the typical unsafe behaviors of the operators in the maritime working environment. In the future, the types of the unsafe behaviors that the method can recognize (e.g., not wearing a mask, not wearing a helmet, fighting, etc.) will be further expanded.

The present invention proposes a method for identifying unsafe behaviors of operators in maritime working environment. The method recognizes typical port and shipping unsafe behaviors through feature extraction, feature association, and action recognition. First, the DarkNet-53 backbone network architecture based on the YOLO V3 detection model implements the image feature extraction, and imports the feature pyramid structure to enhance the multi-scale detection capability to obtain the prediction head information related to the unsafe behaviors of the operators in the maritime images; secondly, retrieving the temporal and spatial interaction information of the operator and the devices in the maritime images based on the JDE paradigm, and then transferring the time memory features of the operators into the feature memory pool, and the asynchronous memory updating algorithm is used for continuous updating; finally, different types of the unsafe behavior interaction modules are constructed to form the dense serial interactive aggregation structure to link the association between the operators, the devices, and the unsafe behaviors to obtain the final recognition results of the unsafe behaviors in the maritime working environment. The present invention has improved robustness, and it can accurately identify the unsafe behaviors of operator in the working environment of the port and the ship bridge, which provide technical supports for the safety of port and shipping traffic.

The content described in the embodiments of the present specification is only an enumeration of the forms of realization of the inventive idea, and the scope of protection of the invention should not be considered limited to the specific forms described in the embodiments, but the scope of protection of the invention also extends to equivalent technical means that can be thought of by a person skilled in the art according to the inventive idea.

What is claimed is:

1. An ensemble deep learning method for identifying unsafe behaviors of operators in maritime working environment, comprising the following steps:

(1) extracting features of maritime images: inputting a surveillance video with one or a multitude of the operators operating a multitude of devices in a maritime working environment, and decomposing the surveillance video into the maritime images, extracting the features from the maritime images based on a YOLO V3 detection model, and then constructing a feature pyramid structure within the YOLO V3 detection model;

(2) retrieving spatial-temporal interaction information of the operators and the devices: extracting instance-level features of the operators and the devices in the maritime images with a JDE paradigm, and meanwhile storing time memory features of the operators in the maritime images;

(3) updating a feature memory pool: transferring spatial-temporal interaction information linked to unsafe behaviors of the operators into the feature memory pool, and then updating the time memory features of the operators in the maritime images with an asynchronous memory updating algorithm;

(4) identifying the unsafe behaviors from the maritime images: establishing a spatial-temporal interaction relationship among the operators, the devices, and the unsafe behaviors by building an asynchronous interaction aggregation network, and identifying the unsafe behaviors in the maritime images with the spatial-temporal interaction relationship;

wherein step (2) comprises the following steps:

(2.1) predicting prediction head information of the maritime images with the JDE paradigm: modeling a united learning function of the prediction head information as a multi-task learning problem with the JDE paradigm, and indicating the united learning function as a weighted linear loss sum of components, the components contain classification information, regression information, and embedding information; predicting the prediction head information with the united learning function being shown in Eq. (3):

$$L_{unite} = \Sigma_{k=1}^{M} \Sigma_{j=(a,b,c)} w_j^k L_j^k \quad (3)$$

wherein M denoting the number of the types of the prediction head information, $L_j^k$, k=1, ..., M, j=a, b, c being a loss function corresponding to the different types of the components, and $w_j^k$, k=1, ..., M, j=a, b, c being a weight coefficient of the loss function;

(2.2) learning a loss weight automatically: determining the loss weight automatically based on task-dependence uncertainty, and then obtaining the classification information, the regression information, and the embedding information, with expression of the function of learning the loss weight automatically being shown as Eq. (4):

$$L_{unite} = \sum_{k=1}^{M} \sum_{j=\{a,b,c\}} \frac{1}{2}\left(\frac{1}{e^{r_j^k}} L_j^k + r_j^k\right) \quad (4)$$

wherein $r_j^k$, k=1, ..., M, j=a, b, c representing the task-dependence uncertainty of each of the loss function;

(2.3) retrieving the spatial-temporal interaction information in the maritime images: splitting a maritime surveillance video into video clips, extracting the instance-level features of the operators and the devices in the maritime images with the united learning function, storing the time memory features of the operators; retrieving the spatial-temporal interaction information from the maritime images, and the spatial-temporal interaction information contain the instance-level features and the time memory features.

2. The ensemble deep learning method for identifying unsafe behaviors of operators in maritime working environment of claim 1, wherein step (1) comprises the following steps:

(1.1) extracting the features from the maritime images: inputting a surveillance video with one or a multitude of the operators operating a multitude of the devices in a maritime working environment, and decomposing the surveillance video into the maritime images, extracting the features in the maritime images using a DarkNet-53 backbone network of the YOLO V3 detection model, and then obtaining the features of each of frames in the maritime images;

implementing a feature extraction from the maritime images with the DarkNet-53 backbone network consisting of convolutional layers and activation layers, with expressions of the convolutional layers and the activation layers in Eq. (1) and Eq. (2):

$$F^{d+1}(i, j) = \left[F^d \odot \omega^{d+1}\right](i, j) + b \quad (1)$$

$$Y_n = \begin{cases} x_n, & x_n \geq 0 \\ \dfrac{x_n}{a_n}, & x_n < 0 \end{cases} \quad (2)$$

wherein F(i, j) denoting a pixel value of the features from each of the frames, ω denoting a convolutional kernel template, $F^d+1$ and $F^d$ respectively denoting the output of the convolutional layer of the layer d+1 and the layer d, b denoting a deviation value, ⊙ denoting a convolutional operation; $x_n$ and $Y_n$ respectively denoting the input and the output of the activation layer of the layer n, $a_n$ denoting a constant value of the activation layers;

(1.2) augmenting image features: integrating the image features at different scales by introducing the feature pyramid structure, and then obtaining prediction head information related to a behavior recognition task in maritime images;

introducing the feature pyramid structure by extracting bottom-up features and fusing top-down features; extracting the bottom-up features by a down-sampling operation, and fusing the top-down features with an up-sampling operation and a lateral connection; the down-sampling operation is to merge the pixel value for augmenting the image features, the up-sampling operation is to copy the pixel value for augmenting the image features, and the lateral connection is to add the image features at the same scale together;

obtaining the prediction head information with a dense prediction map at a scale of (6P+Q)×W×H, wherein composing of classification information with a scale of 4P×W×H, regression information with a scale of 2P×W×H, and embedding information with a scale of Q×W×H, wherein P being the number of anchor templates, Q being a embedding dimension, and W and H being the width and height of the image features; the anchor templates are rectangular templates with different scale in the YOLO V3 detection model.

3. The ensemble deep learning method for identifying unsafe behaviors of operators in maritime working environment of claim 1, wherein step (3) comprises the following steps:

(3.1) tracking the time memory features: transferring the instance-level features and the time memory features of the operators and the devices extracted by the JDE paradigm into the feature memory pool, recording the time memory features linked to the unsafe behaviors of the operators in the maritime images;

(3.2) updating the time memory features asynchronously: updating the time memory features linked to the unsafe behaviors in a training iteration with the asynchronous memory updating algorithm; updating the time memory features with following steps:

(3.2.1) reading the time memory features: reading the instance-level features and the time memory features of the operators and the devices from the feature memory pool for each video clip;

(3.2.2) writing time memory features: terminating the training iteration of the asynchronous memory updating algorithm, writing the time memory features linked to the unsafe behaviors of the operators into the feature memory pool.

4. The ensemble deep learning method for identifying unsafe behaviors of operators in maritime working environment of claim 1, wherein step (4) comprises the following steps:

(4.1) establishing unsafe behavior interaction modules: inputting the instance-level features and the time memory features from the spatial-temporal interaction information extracted by the JDE paradigm, and then establishing three types of the unsafe behavior interaction modules consisting of an interaction among the operators, an interaction between the operators and the devices, and a time-dependent interaction, respectively denoted as P module, O module, N module;

constructing the unsafe behavior interaction modules in the maritime images with transformer mechanism, the transformer mechanism assigning different attention weights to sequence information for the unsafe behavior interaction modules, the P module describing the interaction among the operators in the maritime images, and an input of the P module being the instance-level features or an augmented instance-level features of the operators; the O module describing the interaction between the operators and the devices, and an input of the O module being the instance-level features of the devices; the N module identifying the unsafe behaviors with strong temporal correlation, and an input of the N module being the time memory features of the operators in the maritime images;

(4.2) building dense serial interaction aggregation structure: combining the three types of the unsafe behavior interaction modules in the maritime images, establishing the dense serial interaction aggregation structure based on a plurality of the P modules, the O modules, and the N modules; the dense serial interaction aggregation structure stacking the different types of the unsafe behavior interaction modules sequentially, and then transmitting the spatial-temporal interaction information among the different types of the unsafe behavior interaction modules, learning the different types of the spatial-temporal interaction information in the different types of the unsafe behavior interaction modules;

(4.3) assigning weighted parameters: each of the unsafe behavior interaction modules receiving outputs from the previous unsafe behavior interaction modules in the dense serial interaction aggregation structure, assigning the different weighted parameters to the output of the previous unsafe behavior interaction modules, integrating the spatial-temporal interaction information of the different types of the unsafe behavior interaction modules, with expressions of the function of integrating the spatial-temporal interaction information and a SoftMax normalization function being shown as Eq. (5) and Eq. (6):

$$W_{i,m} = \sum_{m \in D} V_m * F_{i,m} \tag{5}$$

$$\sigma(t) = \frac{1}{1+e^{-t}} \tag{6}$$

wherein $W_{i,m}$ denoting a query feature from the m-th unsafe behavior interaction modules in the dense serial interaction aggregation structure, D denoting an index set of the previous unsafe behavior interaction modules, $V_m$ denoting a learnable multi-dimensional feature vector normalized by the SoftMax normalization function in the index set, * denoting an element-wise multiplication, and $F_{i,m}$ denoting the output of the features augmented by the m-th unsafe behavior interaction module; wherein t denoting the input of the SoftMax function $\sigma(t)$;

(4.4) establishing an unsafe behavior identification model in maritime images: inputting the instance-level features and the time memory features, modeling the spatial-temporal interaction relationship among the operators, the devices, and the unsafe behaviors based on the dense serial interaction aggregation structure, identifying unsafe behavior features of the operators in the maritime working environment, with expression of the function of identifying the unsafe behavior features being shown as Eq. (7);

$$Y_i = Y(P_i, O_i, N_i, \delta) \tag{7}$$

wherein $P_i$ and $O_i$ denoting the instance-level features of the operators and the devices extracted by the JDE paradigm, $N_i$ denoting the time memory features, δ denoting parameters in the dense serial interaction aggregation structure, and $Y_i$ denoting the unsafe behavior features;

(4.5) obtaining unsafe behavior identification results: sending the unsafe behavior features into a classifier to identify the spatial-temporal interaction relationship among the operators, the devices, and the unsafe behaviors in the maritime images, and then obtaining the unsafe behavior identification results in maritime images.

5. An ensemble deep learning method for identifying unsafe behaviors of operators in maritime working environment, comprising the following steps:

(1) extracting features of maritime images: inputting a surveillance video with one or a multitude of the operators operating a multitude of devices in a maritime working environment, and decomposing the surveillance video into the maritime images, extracting the features from the maritime images based on a YOLO V3 detection model, and then constructing a feature pyramid structure within the YOLO V3 detection model;

(2) retrieving spatial-temporal interaction information of the operators and the devices: extracting instance-level features of the operators and the devices in the maritime images with a JDE paradigm, and meanwhile storing time memory features of the operators in the maritime images;

(3) updating a feature memory pool: transferring spatial-temporal interaction information linked to unsafe behaviors of the operators into the feature memory pool, and then updating the time memory features of the operators in the maritime images with an asynchronous memory updating algorithm;

(4) identifying the unsafe behaviors from the maritime images: establishing a spatial-temporal interaction relationship among the operators, the devices, and the unsafe behaviors by building an asynchronous interaction aggregation network, and identifying the unsafe behaviors in the maritime images with the spatial-temporal interaction relationship;

wherein step (4) comprises the following steps:

(4.1) establishing unsafe behavior interaction modules: inputting the instance-level features and the time memory features from the spatial-temporal interaction information extracted by the JDE paradigm, and then establishing three types of the unsafe behavior interaction modules consisting of an interaction among the operators, an interaction between the operators and the devices, and a time-dependent interaction, respectively denoted as P module, O module, N module;

constructing the unsafe behavior interaction modules in the maritime images with transformer mechanism, the transformer mechanism assigning different attention weights to sequence information for the unsafe behavior interaction modules, the P module describing the interaction among the operators in the maritime images, and an input of the P module being the instance-level features or the augmented instance-level features of the operators; the O module describing the interaction between the operators and the devices, and an input of the O module being the instance-level features of the devices; the N module identifying the unsafe behaviors with strong temporal correlation, and an input of the N module being the time memory features of the operators in the maritime images;

(4.2) building dense serial interaction aggregation structure: combining the three types of the unsafe behavior interaction modules in the maritime images, establishing the dense serial interaction aggregation structure based on a plurality of the P modules, the O modules, and the N modules; the dense serial interaction aggregation structure stacking the different types of the unsafe behavior interaction modules sequentially, and then transmitting the spatial-temporal interaction information among the different types of the unsafe behavior interaction modules, learning the different types of the spatial-temporal interaction information in the different types of the unsafe behavior interaction modules;

(4.3) assigning weighted parameters: each of the unsafe behavior interaction modules receiving outputs from the previous unsafe behavior interaction modules in the dense serial interaction aggregation structure, assigning the different weighted parameters to the output of the previous unsafe behavior interaction modules, integrating the spatial-temporal interaction information of the different types of the unsafe behavior interaction modules, with expressions of the function of integrating the spatial-temporal interaction information and the SoftMax normalization function being shown as Eq. (5) and Eq. (6):

$$W_{i,m} = \sum_{m \in D} V_m * F_{i,in} \quad (5)$$

$$\sigma(t) = \frac{1}{1+e^{-t}} \quad (6)$$

wherein $W_{i,m}$ denoting a query feature from the m-th unsafe behavior interaction modules in the dense serial interaction aggregation structure, D denoting an index set of the previous unsafe behavior interaction modules, $V_m$ denoting a learnable multi-dimensional feature vector normalized by the SoftMax normalization function in the index set, * denoting an element-wise multiplication, and $F_{i,m}$ denoting the output of the features augmented by the m-th unsafe behavior interaction module; wherein t denoting the input of the SoftMax function σ(t);

(4.4) establishing an unsafe behavior identification model in maritime images: inputting the instance-level features and the time memory features, modeling the spatial-temporal interaction relationship among the operators, the devices, and the unsafe behaviors based on the dense serial interaction aggregation structure, identifying unsafe behavior features of the operators in the maritime working environment, with expression of the function of identifying the unsafe behavior features being shown as Eq. (7);

$$Y_i = Y(P_i, O_i, N_i, \delta) \quad (7)$$

wherein $P_i$ and $O_i$ denoting the instance-level features of the operators and the devices extracted by the JDE paradigm, $N_i$ denoting the time memory features, δ denoting parameters in the dense serial interaction aggregation structure, and $Y_i$ denoting the unsafe behavior features;

(4.5) obtaining unsafe behavior identification results: sending the unsafe behavior features into a classifier to identify the spatial-temporal interaction relationship among the operators, the devices, and the unsafe behaviors in the maritime images, and then obtaining the unsafe behavior identification results in maritime images.

\* \* \* \* \*